(12) United States Patent
Yeh

(10) Patent No.: US 12,423,387 B2
(45) Date of Patent: Sep. 23, 2025

(54) CLASSIFICATION METHOD AND CLASSIFICATION DEVICE THEREOF

(71) Applicant: Wistron Corporation, New Taipei (TW)

(72) Inventor: Chih-Hsin Yeh, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 18/533,193

(22) Filed: Dec. 8, 2023

(65) Prior Publication Data

US 2025/0103683 A1  Mar. 27, 2025

(30) Foreign Application Priority Data

Sep. 21, 2023 (TW) .................... 112136033

(51) Int. Cl.
*G06F 18/2415* (2023.01)
*G06F 16/2457* (2019.01)

(52) U.S. Cl.
CPC .... *G06F 18/2415* (2023.01); *G06F 16/24578* (2019.01)

(58) Field of Classification Search
CPC ........ G06F 18/2415; G06F 16/24578
See application file for complete search history.

(56) References Cited

U.S. PATENT DOCUMENTS

| | | | |
|---|---|---|---|
| 2005/0060102 A1* | 3/2005 | O'Reilly ............ | G16B 50/20 702/20 |
| 2015/0193699 A1* | 7/2015 | Kil .................... | G06N 5/022 706/12 |
| 2018/0004902 A1* | 1/2018 | Aronow ............. | G16H 10/60 |
| 2019/0156216 A1* | 5/2019 | Gupta ................ | G06N 3/126 |
| 2020/0089771 A1* | 3/2020 | Trabelsi ............. | G06F 40/58 |
| 2020/0327194 A1* | 10/2020 | Tan .................... | G06F 40/166 |
| 2021/0125722 A1* | 4/2021 | Sherkat ............. | G06V 10/764 |
| 2022/0383489 A1* | 12/2022 | Shi ..................... | G06T 7/11 |
| 2023/0419652 A1* | 12/2023 | Tiong ................ | G06V 10/82 |
| 2024/0020486 A1* | 1/2024 | Yang .................. | G06N 3/0495 |

FOREIGN PATENT DOCUMENTS

TW          202207955 A     3/2022
WO   WO-2020243556 A1 *  12/2020  .......... G06V 10/454

* cited by examiner

*Primary Examiner* — Brittany N Allen
*Assistant Examiner* — Earl Levi Elias
(74) *Attorney, Agent, or Firm* — Winston Hsu

(57) ABSTRACT

A classification device and a classification method for the classification device are disclosed to improve efficiency to find out a toxicant class. The classification method includes obtaining first data, and generating at least one heatmap and at least one probability of at least one toxicant class according to a classification model by using the first data. Any of the at least one toxicant class corresponds to one of the at least one probability. Any of the at least one heatmap is used to visualize influence of each of a plurality of tokens of the first data on attributing cause of poisoning to one or more of the at least one toxicant class.

16 Claims, 10 Drawing Sheets

Taiwan Poisoning Search System    Taipei Veterans General Hospital Emergency Room Dr. Daming Chen (Log out)

20IN → Patient information    20

Basic information
Name [Wang Daxiong]    Gender ●Male ○Female    Age [48] years old    Weight [65] Kg    Occupation [Farmer]

Cause of poisoning
Exposure substance [ ]
Exposure substance composition [ ]
Exposure route [Oral]    Exposure reason [Suicide]
Exposure time [2021-01-01]

Physiological status
Respiratory rate [24] times/minute    Blood pressure [90]/[55] mmHg
Heart rate [110] beats/minute    Body temperature [37.9] °C
Consciousness status E[3] V[4] M[5]    Patient need to be carefully observed
Laboratory data [ ]

Preliminary treatment
[ ]

Poisoning symptoms
[Nausea] [Vomiting] [Diarrhea] [Sweating] [Shock]
[Convulsion] [Coma]

(Search)

FIG. 2

CLASSIFICATION METHOD AND CLASSIFICATION DEVICE THEREOF

BACKGROUND OF THE INVENTION

1. Field of the Invention

The present invention relates to a classification method and a classification device thereof, and more particularly, to a classification method and a classification device thereof to improve the efficiency of poisoning consultation and diagnosis services, to shorten medical treatment process for poisoning, and to reduce casualties caused by poisoning.

2. Description of the Prior Art

To meet urgent need for immediate diagnosis and treatment of poisoning, the 24-hour telephone consultation service network of the poison control center (PCC) provides the public and health professional with consultation, medical care, educational training, prevention concepts, and other related services about various types of poisoning. Since the toxic substance for a considerable proportion of the consultation cases received is unknown/unclear in the early stages of poisoning, it is required to make preliminary differential diagnosis based on poisoning symptoms, and then a final diagnosis can be made based on necessary poison testing or patient disclosure upon waking. It is evident that diagnostic efficiency of toxicant classes needs improvement.

SUMMARY OF THE INVENTION

It is therefore a primary objective of the present invention to provide a classification method and a classification device thereof, to improve over disadvantages of the prior art.

The present invention discloses a classification method, for a classification device, comprising obtaining first data; and generating at least one heatmap and at least one probability of at least one toxicant class according to a classification model using the first data, wherein each of the at least one toxicant class corresponds to one of the at least one probability, and each of the at least one heatmap is used to visualize influence of each of a plurality of tokens of the first data on attributing cause of poisoning to one or more of the at least one toxicant class.

The present invention discloses a classification device, comprising a storage circuit, and a processing circuit, coupled to the storage device, configured to execute an instruction stored in the storage circuit. The storage circuit is configured to store the instruction comprising obtaining first data; and generating at least one heatmap and at least one probability of at least one toxicant class according to the first data, wherein each of the at least one toxicant class corresponds to one of the at least one probability, and each of the at least one heatmap is used to visualize influence of each of a plurality of tokens of the first data on attributing cause of poisoning to one or more of the at least one toxicant class.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 to FIG. 3 are schematic diagrams of windows according to embodiments of the present invention.

DETAILED DESCRIPTION

Figure 1:
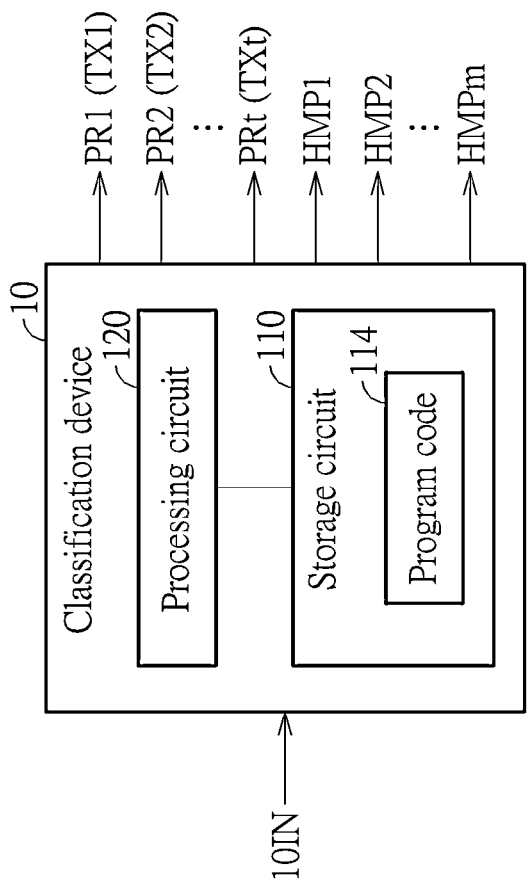
FIG. 1 is a schematic diagram of a classification device according to an embodiment of the present invention.

FIG. 1 is a schematic diagram of a classification device 10 according to an embodiment of the present invention. The classification device 10 (e.g., a computer or a host), which may include a storage circuit 110 and a processing circuit 120, may be installed/located in the poison control center or a medical institution. The storage circuit 110 is configured to store a program code 114. The processing circuit 120 may read and execute the program code 114 through the storage circuit 110. The classification device 10 may receive data 10IN, and output heatmaps HMP1 to HMPm and probabilities PR1 to PRt corresponding to t toxicant classes (or poison categories) TX1-TXt respectively according to the data 10IN.

In one embodiment, the data 10IN shown in FIG. 1 may include poisoning symptoms, test values, physiological status, laboratory data, incident details (also referred to as event content), or basic information about a patient (e.g., a poisoned victim), etc.; alternatively, the data 10IN may include data input into a window. For example, FIG. 2 is a schematic diagram of a window 20 according to an embodiment of the present invention. Examiner(s) (e.g., a physician, professional consultant, or health professional) may input data 20IN, such as basic information (e.g., name, gender, age, weight, occupation), cause of poisoning (e.g., exposure substance, exposure substance composition, exposure route, exposure time, exposure reason), physiological status (e.g., respiratory rate, blood pressure, heart rate, body temperature, consciousness status, laboratory data), poisoning symptoms (e.g., nausea, vomiting, diarrhea, sweating, shock, convulsion, coma) or preliminary treatment completed, etc., into the window 20. The data 20IN may be used to implement the data 101N.

Figure 3:
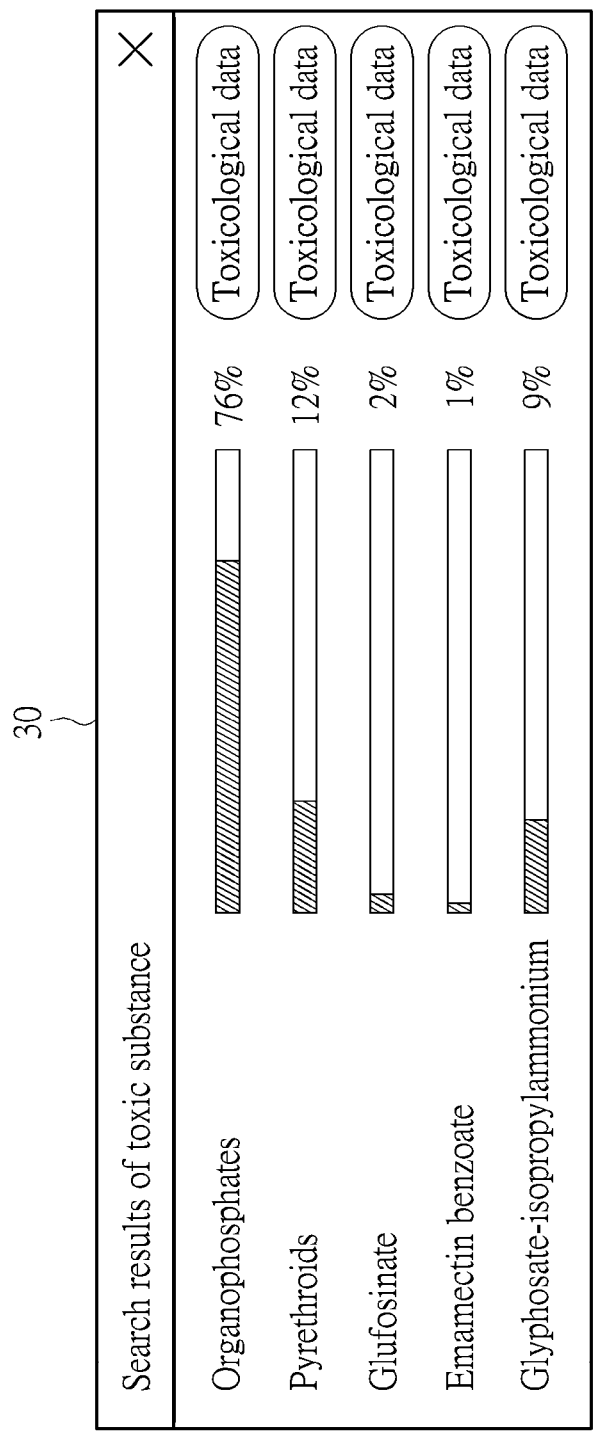

In one embodiment, the probabilities PR1-PRt shown in FIG. 1 represent the likelihood that the patient corresponding to the data (e.g., 10IN or 20IN) is poisoned by the toxicant classes TX1-TXt. The probabilities PR1-PRt output by the classification device 10 may be presented using a window. For example, FIG. 3 is a schematic diagram of a window 30 according to an embodiment of the present invention. The window 30 displays 5 possible toxicant classes (e.g., TX1-TX5) and their probabilities (e.g., PR1-PR5). That is to say, according to the data (10IN or 20IN) of the patient, there is 76% likelihood that the cause of poisoning is attributed to organophosphates.

Figure 4:
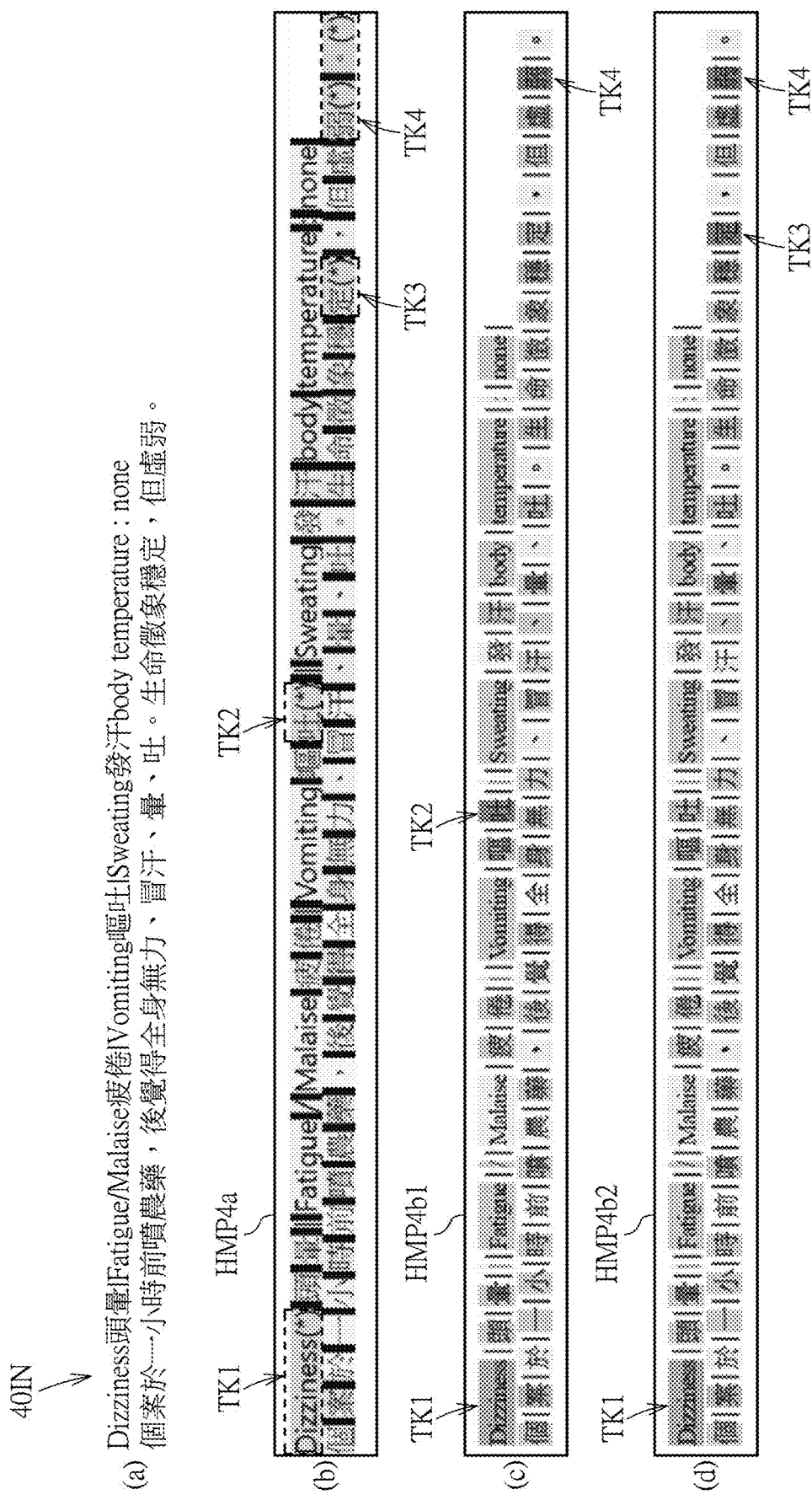
FIG. 4 is a schematic diagram of data and heatmaps according to an embodiment of the present invention.

In one embodiment, the heatmaps HMP1-HMPm shown in FIG. 1 may correspond to one or more of the toxicant classes TX1-TXt and may be used to visualize which token(s) of the data (e.g., 10IN or 20IN) will be focused when the data (e.g., 10IN or 20IN) or illness is categorized as the corresponding toxicant class/classes. That is, each of the heatmaps HMP1-HMPm visualize/highlight the importance/influence/attention level of each token of the data (e.g., 10IN or 20IN) on attributing the data (e.g., 10IN or 20IN) or illness to the toxicant class/classes (e.g., TX1, . . . or TXt). For example, FIG. 4 is a schematic diagram of data 40IN and heatmaps HMP4a to HMP4b2 according to an embodiment of the present invention. The data 40IN may be used to implement or may include the data 10IN or 20IN. For example, the data 40IN may be the conversion data corresponding to the data 20IN after data pre-processing.

In one embodiment, the classification device 10 may output only one heatmap (e.g., HMP4a) corresponding to the t toxicant classes TX1-TXt. The heatmap HMP4a may be used to implement a heatmap corresponding to all toxicant classes (e.g., TX1-TXt). That is to say, the heatmap HMP4a is configured to visualize the importance of each token in the data 40IN in classification, but it may not be targeted at one particular toxicant class (e.g., TX1). In the heatmap HMP4a, darker-colored token(s) indicate higher importance/influence on classification, and token(s) enclosed in dashed box/boxes (e.g., a token TK1 (i.e., "dizziness"), and tokens TK2-TK4) is/are the most influential on classification decision. In other words, the classification device 10 may provide reference criteria for ascertaining the dependability of classification.

In one embodiment, the classification device 10 may output t heatmaps corresponding to the t toxicant classes TX1 to TXt (e.g., two heatmaps HMP4b1 and HMP4b2 corresponding to two toxicant classes). The heatmap HMP4b1 may be specifically displayed for one particular toxicant class (e.g., TX1), and may be configured to visualize the influence of each token in the data 40IN to ascribe the cause of poisoning, which corresponds to the data 40IN, to the toxicant class (TX1). The heatmap HMP4b2 may be specifically shown for another toxicant class (e.g., TX2), and may be configured to visualize the influence of each token in the data 40IN to ascribe the cause of poisoning, which corresponds to the data 40IN, to the toxicant class (TX2). In the heatmap HMP4b1, darker-colored token(s) represent higher importance/influence on classifying the data 40IN as the toxicant class (e.g., TX1) which the heatmap HMP4b1 corresponds to; for example, darker-colored tokens TK1 (i.e., "dizziness"), TK2, and TK4 have the greatest influence on attributing the cause of poisoning to the toxicant class (TX1). In the heatmap HMP4b2, darker-colored token(s) represent higher importance/influence on classifying the data 40IN as the toxicant class (e.g., TX2) which the heatmap HMP4b2 corresponds to; for example, darker-colored tokens TK1 (i.e., "dizziness"), and TK3-TK4 have the greatest influence on attributing the cause of poisoning to the toxicant class (TX2). In other words, the classification device 10 may provide different reference criteria for attributing the cause of poisoning to different toxicant classes.

In the medical field, examiners (or personnel of the poison control center) often possess medical expertise, so the classification device 10 and the examiners tend to have a collaborative relationship. Furthermore, the examiner's description of the same symptom may not be clear enough or the wording may be incomplete. Therefore, whether during a training phase or a prediction phase, the classification device 10 outputs heatmap(s) (e.g., HMP1-HMPm or HMP4a-HMP4b2) to present token(s) that the classification device 10 focuses on during classification. In this way, both engineer(s) executing the program code 114 in the training phase and examiner(s) executing the program code 114 in the prediction phase can determine/assess whether the classification of the classification device 10 is flawed/inappropriate, whether the classification of the classification device 10 is misled by unimportant information, or whether the examiner's description is complete. This aids examiners in making more accurate diagnoses using the classification device 10.

Figure 5:
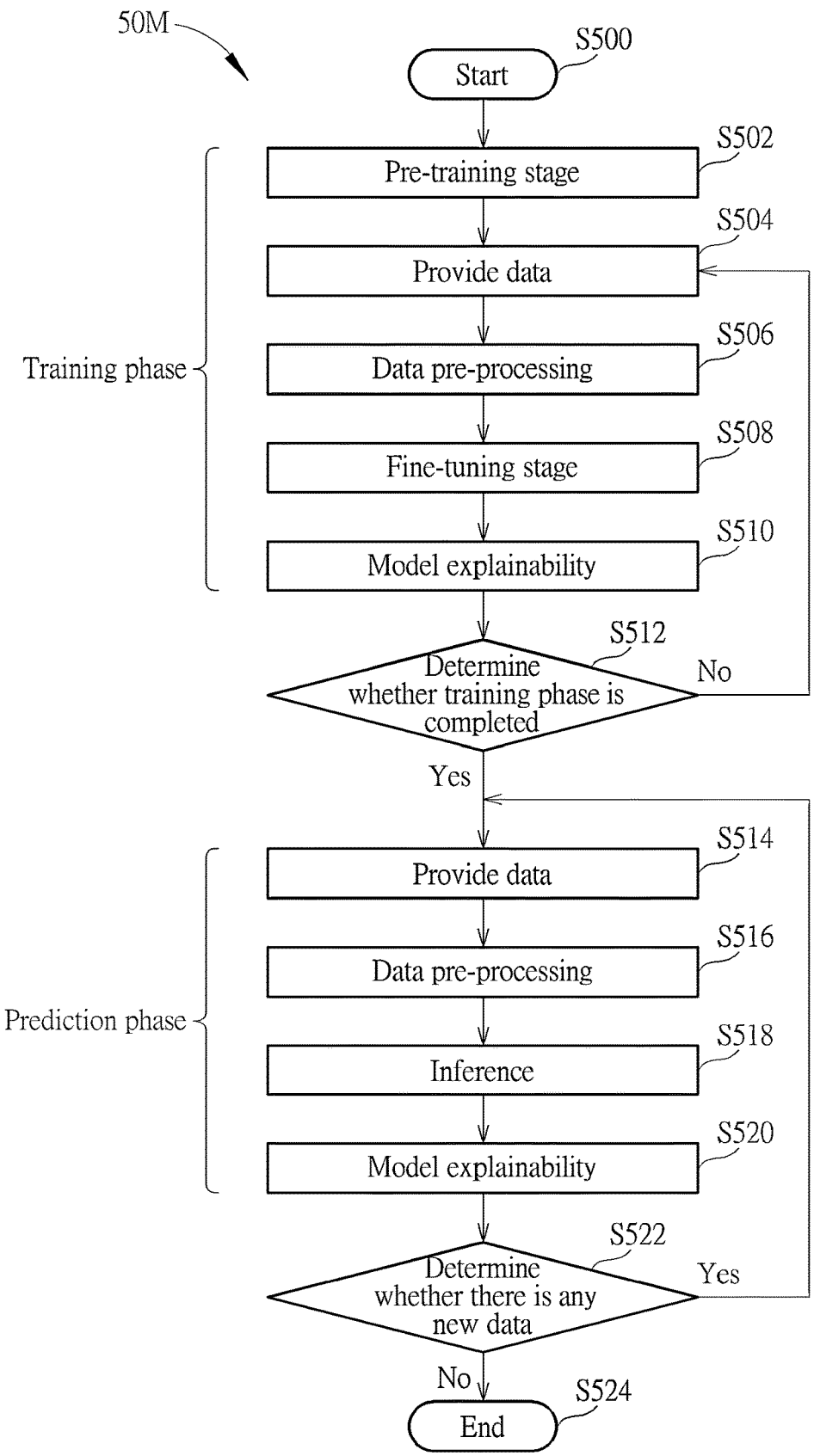
FIG. 5 is a flowchart of a classification method according to an embodiment of the present invention.

FIG. 5 is a flowchart of a classification method 50M according to an embodiment of the present invention. The classification method 50M is suitable for the classification device 10, and at least part of the classification method 50M may be compiled into a program code (e.g., 114). The classification method 50M may include the following steps:

Step S500: Start.

Step S502: The classification device 10 may pre-train a language model module (e.g., 610, 810, 910, or 1110) of a classification model (e.g., 60, 80, 90, 11Cla, or 11CLb) of the classification device 10. In other words, a pre-training stage begins.

Step S504: The classification device 10 may receive at least one data (e.g., 10IN or 201N), which may be referred to as second data.

Step S506: The classification device 10 may perform data pre-processing on the at least one data (e.g., 10IN or 201N) to convert the at least one data into at least one conversion data, which may be referred to as first data, respectively.

Step S508: The classification device 10 may train or fine-tune the classification model (e.g., 60, 80, 90, 11Cla, or 11CLb) using the at least one conversion data. In other words, a fine-tuning stage begins.

Step S510: Use model explainability (e.g., heatmap(s)) to determine/evaluate whether the classification of the classification model is defective or incorrect. The classification device 10 may use the classification model to generate heatmap(s) (e.g., HMP1-HMPm or HMP4a-HMP4b2) and probability/probabilities (e.g., PR1-PRt) of at least one toxicant class (e.g., TX1-TXt).

Step S512: The classification device 10 may determine whether a training phase of the classification model (e.g., 60, 80, 90, 11CLa or 11CLb) is completed. If the training phase finishes, it may proceed to a prediction phase to perform Step S514; if the training phase is not successfully completed, it may go back one of Steps S502-S508.

Step S514: The classification device 10 may receive another data (e.g., 10IN or 20IN), which may be referred to as second data.

Step S516: The classification device 10 may perform data pre-processing on the data (e.g., 10IN or 201N) received in Step S514 to convert the data into one conversion data, which may be referred to as first data.

Step S518: The classification device 10 may make inference(s)/prediction(s) using the classification model having been trained by the classification device 10 according to the conversion data generated in Step S516.

Step S520: Use model explainability (e.g., heatmap(s)) to determine/evaluate whether the classification of the classification model having been trained (e.g., 60, 80, 90, 11CLa or 11CLb) is defective or incorrect. The classification device 10 may use the classification model having been trained to generate heatmap(s) (e.g., HMP1-HMPm or HMP4a-HMP4b2) and probability/probabilities (e.g., PR1-PRt) of at least one toxicant class (e.g., TX1-TXt) according to the conversion data generated in Step S516.

Step S522: The classification device 10 may determine if any other data is received in Step S514. If no new data is received, it proceeds to Step S524.

Step S524: End.

One or more of Steps S502-S522 may be omitted/deleted according to different requirements. For example, in one embodiment, only Steps S502-S510 may be performed to execute the training phase; in another embodiment, only Steps S514-S520 may be performed to execute the prediction phase. For example, in one embodiment, if the data meets requirements and does not require data pre-processing, Step S506 or S516 may be omitted.

The classification method 50M is detailed below. For ease of understanding, Step S502 (of the pre-training stage) and Step S508 (of the fine-tuning stage) are described first, followed by a detailed discussion of Steps S504, S506, and S510-S520.

Figure 6:
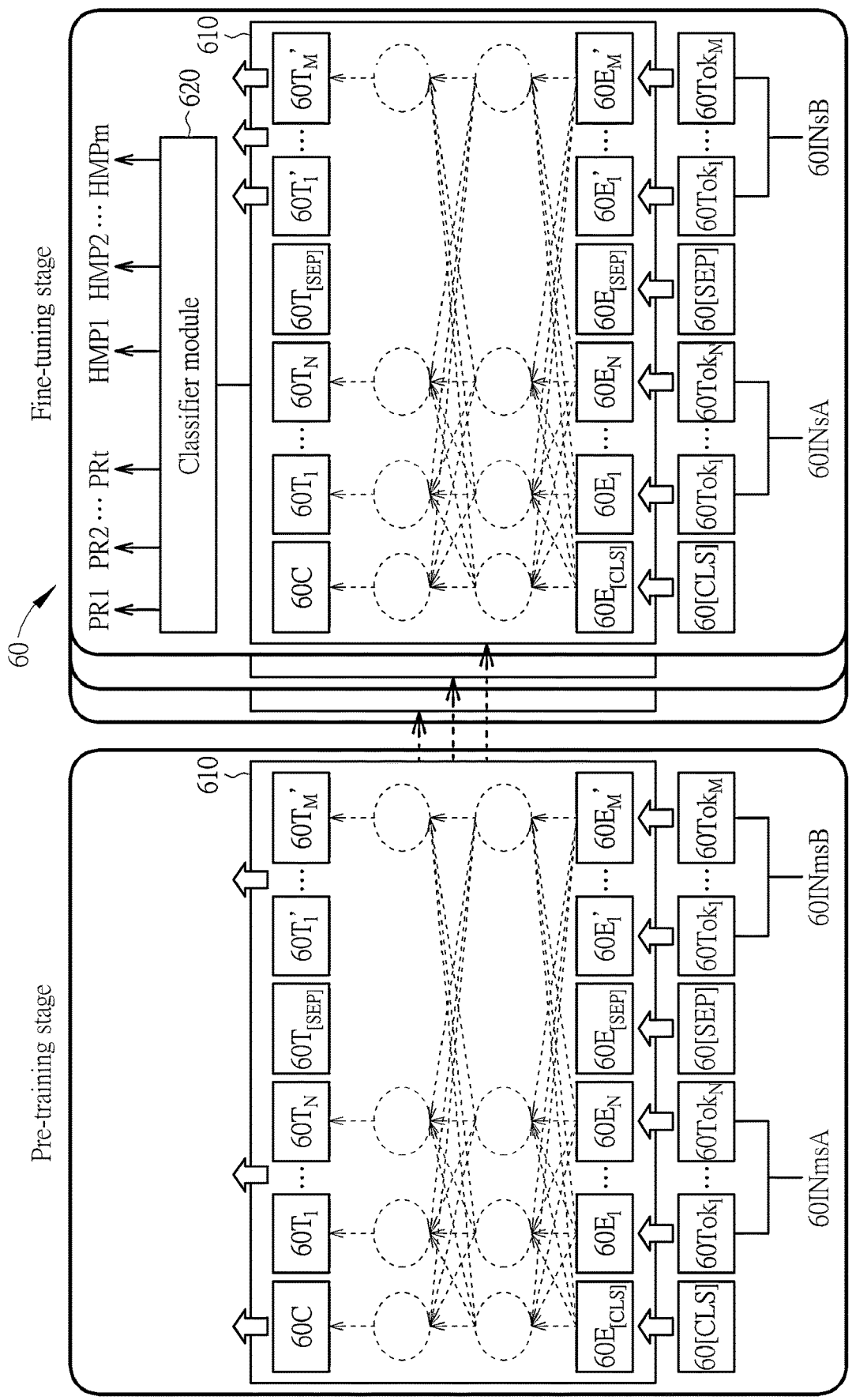
FIG. 6 is a schematic diagram of a classification model in the fine-tuning stage and a corresponding language model module in the pre-training stage according to an embodiment of the present invention.

In one embodiment, two-stage deep learning text classification transfer learning may be employed to build/train a classification model (e.g., 60, 80, 90, 11Cla, or 11CLb). In other words, a training phase to train the classification model may be divided into a pre-training stage and a fine-tuning stage. For example, FIG. 6 is a schematic diagram of a classification model 60 in the fine-tuning stage and a corresponding language model module 610 in the pre-training stage according to an embodiment of the present invention. The classification model 60 may include the language model module 610 and a classifier module 620. The language model module 610 may include neurons 60C, $60T_1$ to $60T_N$, $60T_{[SEP]}$, $60T_1'$ to $60T_M'$, $60E_{[CLS]}$, $60E_1$ to $60E_N$, $60E_{[SEP]}$, $60E_1'$ to $60E_M'$. The language model module 610 may adopt, for example, BERT, GPT, T5, Roberta, mBERT, mGPT, mT5, XLM-Roberta, or other algorithms. In one embodiment, the classifier module 620 may be a linear classifier. In one embodiment, the classifier module 620 may include a neural network, which, for example, may include at least one fully connected layer or other neural network layers. In one embodiment, the last layer of the classifier module 620 may use the Softmax function to ensure that the sum of all the probabilities (e.g., PR1-PR5) output from the last layer equals 1. The probabilities of the toxicant classes (e.g., TX1-TX5) are then output to assist examiner(s) in making judgments. Through the pre-training stage and the fine-tuning stage, the classification model can understand the contextual relationships in medical records and accurately establish the link/relation between historical patient poisoning records and toxicant classes.

Figure 7:
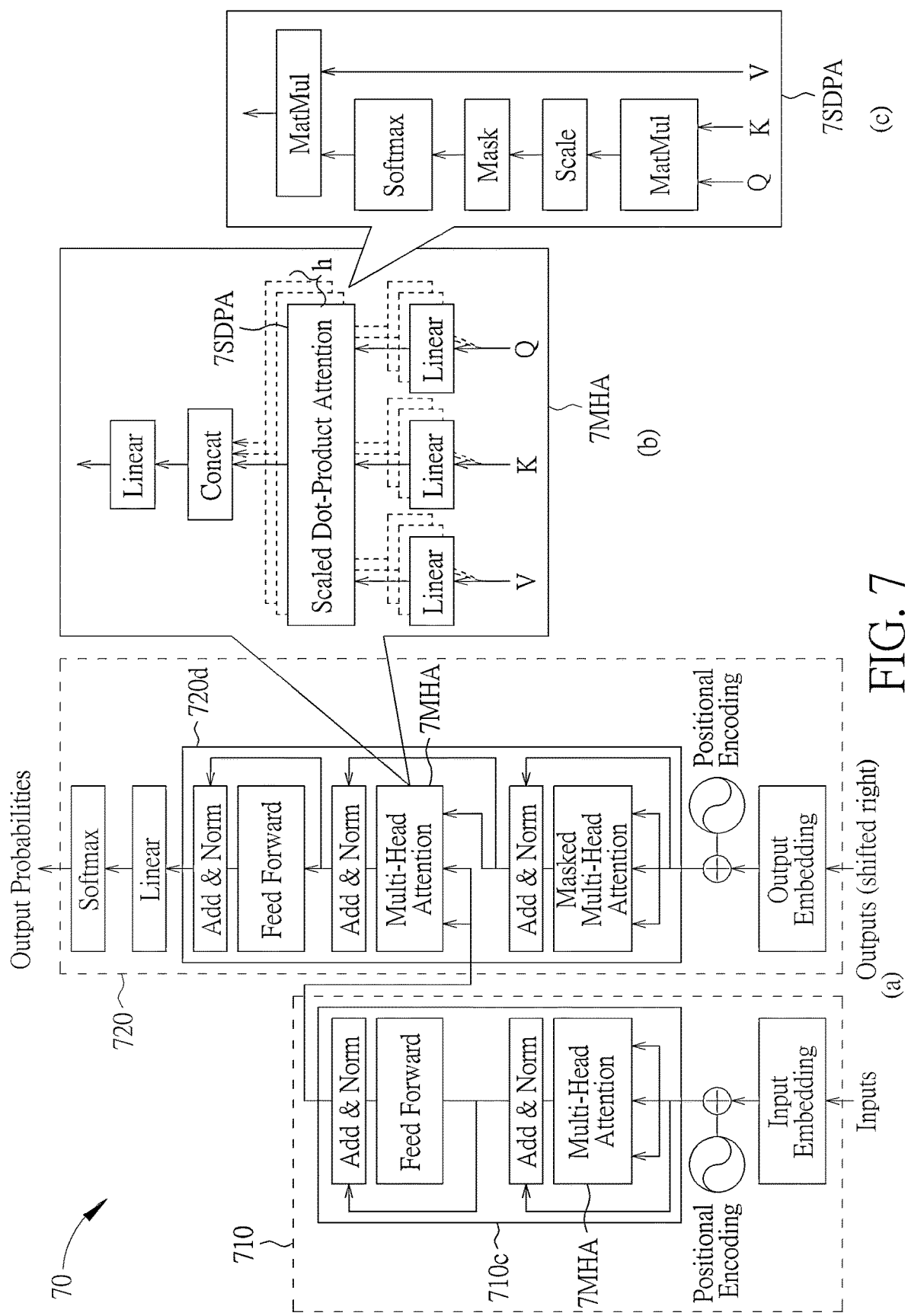
FIG. 7 is a schematic diagram of a model according to an embodiment of the present invention.

In Step S502, in the pre-training stage, the language model module of the classification model may be pre-trained to initialize parameters of the classification model. Specifically, a language model module (e.g., 610, 810, 910 or 1110) may be implemented using a pre-trained language model for training in a Transformer-based pre-training stage, and pre-training is performed according to a large amount of general articles (e.g., pre-training with Wikipedia articles in multiple languages) to achieve excellent generalization capabilities for texts in different languages. For example, in the pre-training stage shown in FIG. 6, several tokens (e.g., tokens 60[CLS], 60[SEP], tokens $60Tok_1$ to $60Tok_N$ of unlabeled data 60INmsA, or tokens $60Tok_1$ to $60Tok_M$ of unlabeled data 60InmsB) are input into the language model module 610, and the language model module 610 may be coupled to a linear multi-class classifier so as to output at least one token or may be coupled to a linear binary classifier so as to output 0 or 1. FIG. 7 is a schematic diagram of a model 70 according to an embodiment of the present invention. As shown in FIG. 7 (a), the model 70 may include an encoder 710 and a decoder 720. The encoder 710 may include a plurality of encoder layers 710c (e.g., 12 layers of encoder layers 710c). Each encoder layer 710c may include a multi-head attention layer 7MHA including a plurality of attention heads. The decoder 720 may include a plurality of decoder layers 720d. FIGS. 7 (b) and (c) respectively illustrate the multi-head attention layer 7MHA and a scaled dot-product attention layer 7SDPA of the model 70. In one embodiment, the language model module (e.g., 610) may be implemented using the encoder 710. In Step S508, in the fine-tuning stage following the pre-training stage, parameters of the classification model may be fine-tuned using the at least one data (e.g., 10IN or 20IN). Specifically, when training a specific downstream classification task (e.g., sequence classification) in the fine-tuning stage, labeled data (with category label(s)) is used for training (in Step S504); therefore, supervised learning occurs for the classification model (e.g., 60, 80, 90, 11CLa, or 11CLb) to fine-tune the parameters (so that the outputs of the classification model gradually approaches the category label(s)). Accordingly, the classification model may make prediction(s)/inference(s) for new data in the prediction phase. For example, in the fine-tuning stage shown in FIG. 6, several tokens (e.g., tokens 60[CLS], 60[SEP], tokens $60Tok_1$ to $60Tok_N$ of labeled data 60InsA, tokens $60Tok_1$ to $60Tok_M$ of labeled data 60INsB) are input into the classification model 60. As a result, the classification model 60 may predict the heatmap(s) (e.g., HMP1-HMPm) and the probabilities (e.g., PR1-PRt) for the toxicant classes (e.g., TX1-TXt).

As set forth above, in Step S504, labeled data may be input into the classification model (e.g., 60, 80, 90, 11Cla, or 11CLb), and each category label may be or may be associated with one toxicant class (e.g., TX1-TXt); that is to say, labeled data may refer to data of patient(s) whose cause(s) of poisoning has/have been identified. To enable the classification model to learn the logic/experience/knowledge of doctors in diagnosing poisoned patients, data being input may further include consultation results with the poison control center. As a result, the classification model 60 having been trained can output the heatmap(s) (e.g., HMP1-HMPm) and the probabilities (e.g., PR1-PRt) for the toxicant classes (e.g., TX1-TXt).

In Step S506, data pre-processing may include/involve concatenation, translation (or code switching), removal of ignorable word(s) (e.g., symbol(s) or stop word(s)), case conversion (to lower case), tokenization, representing document(s) or data with word index/indices, padding document(s) or data to a specified length or the same length, or categorical (type) encoding. In one embodiment, textual data may undergo natural language processing (NLP) related pre-processing, such as removing values having little influence on the language model module (e.g., 610, 810, 910, or 1110), avoiding abbreviations/acronyms, or including misspelling detection and correction to facilitate the extraction of text feature(s) in subsequent natural language processing.

Regarding Step S506, in one embodiment, since values are generally not meaningful for the language model module (e.g., 610, 810, 910 or 1110), numerical fields (or numerical field data/subdata) of data (e.g., 10IN or 20IN) may be converted into categorical type (data/subdata), which is more meaningful than numerical type (data/subdata), during data pre-processing. For example, Table 1 lists possible numerical type data conversions (e.g., converting body temperature less than 37.8 degrees into normal body temperature), but the present invention is not limited thereto. In one embodiment, during data pre-processing, the physiological status of data (e.g., 10IN or 20IN) of a patient may be logically sorted/streamlined into categorical type (data/subdata) with more classifiable meaning, and then the field(s) corresponding to the physiological status may be integrated/combined into text field(s) (e.g., incident details).

TABLE 1

| Numerical Field Item | Categorical Type Conversion |
|---|---|
| Body Temperature | ≥37.8 → Fever |
|  | <37.8 → Normal |
| Coma Scale | (Sum of Consciousness Status E + V + M) |
|  | >7 → Moderate Coma |
|  | ≤7 → Severe Coma |
| Degree of Poisoning | 1 → Mild Poisoning |
|  | 2 → Moderate Poisoning |
|  | 3 → Severe Poisoning |
|  | 4 → Poisoning Death |

Step S502 may be related to Step S506. In one embodiment, data (e.g., 10IN or 20IN) may be multilingual data (e.g., processing a mix of Chinese and English rather than solely processing English or solely processing Chinese). To address the issue of multilingual text or data, in one embodiment, the language model module (e.g., 610) may adopt a multilingual model (e.g., mBERT, mGPT, mT5, or XLM-Roberta) that has been trained (or has learned) using multilingual text(s) to perform downstream classification tasks on data of toxicology. Therefore, in the pre-training stage of Step S502, the multilingual model may be based on a language model (e.g., BERT, GPT, T5, or Roberta) and trained using a large number of multilingual texts; correspondingly, the data pre-processing in Step S506 may not include translation. In another embodiment, the language model module (e.g., 610) may adopt a medical model (e.g., Bio-ClinicalBERT, PubMedGPT, Clinical-T5, or BioClin-RoBERTa) that has been trained (or has learned) using clinical medical text(s) to perform downstream classification tasks on data of toxicology. Therefore, in the pre-training stage of Step S502, the medical model may be based on a language model (e.g., BERT, GPT, T5, or Roberta) and trained using a large number of clinical medical texts; correspondingly, the data pre-processing of Step S506 may include translation (e.g., translating non-English content into English content). In one embodiment, several pre-trained multilingual model experimental iterations may be tried to solve the problem of multilingual text(s) or data.

The method for visualizing the multi-head attention mechanism of the classification model (e.g., 60, 80, 90, 11CLa, or 11CLb) in Step S510 may be adjusted based on different design considerations. In one embodiment, since self-attention is an important mechanism for the execution of the classification model, attention weight(s) of multi-head attention layer(s) (e.g., 7MHA or 8MHA1 to 8MHAz) of the classification model may be extracted to observe all attention patterns of each encoder layer (e.g., 710c) when the classification model evaluates/judges one certain text or data and determine whether critical word pattern(s) of judgment result(s) are correctly captured. The classification model may use visualized attention weights (e.g., heatmap(s)) to clarify where the classification model focuses its "attention" when generating sequences in practice.

In one embodiment, an attention weight of a specific and single multi-head attention layer (e.g., 7MHA, 8MHA1, . . . or 8MHAz) may be considered as a weighted/relevance score or an attention score. For example, attention score(s) of the last multi-head attention layer (e.g., 7MHA or 8MHAz) is/are chosen/used to visualize the multi-head attention mechanism of the classification model (e.g., 60, 11CLa, or 11CLb) in Step S510.

In another embodiment, several multi-head attention layers (e.g., 7MHA, 8MHA1 . . . or 8MHAz) may be combined to visualize the multi-head attention mechanism of the classification model (e.g., 60, 11CLa, or 11CLb) in Step S510. For example, attention scores of specific multi-head attention layers (e.g., 7MHA, 8MHA1 . . . or 8MHAz) may be calculated (e.g., averaging attention obtained for each token).

Figure 8:
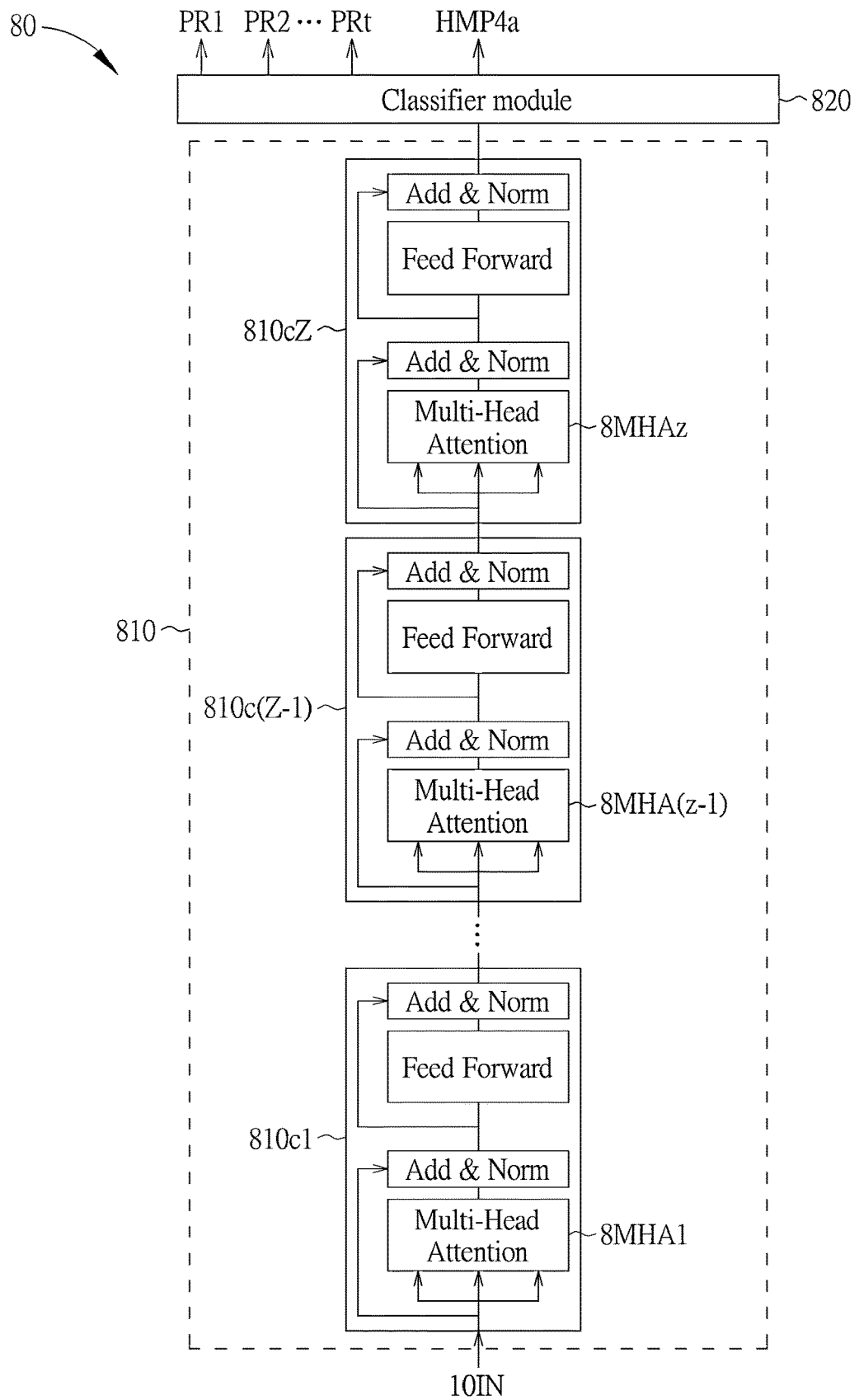
FIG. 8 to FIG. 10 are schematic diagrams of classification models according to embodiments of the present invention.

For example, FIG. 8 is a schematic diagram of a classification model 80 according to an embodiment of the present invention. The classification model 80 may include a language model module 810 and a classifier module 820. The language model module 810 may include encoder layers 810c1 to 810cZ. Each encoder layer (e.g., 810cZ) may include a multi-head attention layer (e.g., 8MHAz) including a plurality of attention heads. An attention head of the y-th multi-head attention layer 8MHAy may take as input a sequence of vectors h1 to hx corresponding to x tokens of the data having been input. Each vector hi (e.g., hx) may be transformed into a query vector $q_i^{(y)}$, a key vector $k_i^{(y)}$, and a value vector $v_i^{(y)}$ through separate linear transformations. The attention head of the y-th multi-head attention layer 8MHAy may compute an attention weight $\alpha_{ij}^{(y)}$ between all tokens as Softmax normalized matrix product between the query vector $q_i^{(y)}$ and the key vector $k_i^{(y)}$; that is, $$\alpha_{ij}^{(y)} = \frac{e^{q_i^{(y)T} k_j^{(y)}}}{\sum_{l=1}^{x} e^{q_i^{(y)T} k_l^{(y)}}}.$$

An output $o_i^{(y)}$ of the attention head is a weighted sum of the value vectors $v_i^{(y)}$; that is, $o_i^{(y)} = \alpha_{ij}^{(y)} v_j^{(y)}$. Each of the multi-head attention layers 8MHA1-8MHAz, each of the encoder layers 810c1-810cZ, and the classifier module 820 may be implemented using the multi-head attention layer 7MHA, the encoder layer 710, and the classifier module 620, respectively. The attention of certain multi-head attention layer(s) (e.g., the 6th multi-head attention layer 8MHA6 to the 10th multi-head attention layer 8MHA10) of the classification model 80 may focus on token(s) of the next sentence, and certain multi-head attention layer(s) (e.g., the 7th multi-head attention layer 8MHA7 and the 8th multi-head attention layer 8MHA8) may be aggregated to obtain weighted score(s). Darker color on a heatmap (e.g., HMP4a) represents/corresponds to higher weighted score(s), and feature extraction may be performed on the elements of interest by the classification model 80. Additionally, certain token(s) with the highest weighted score(s) (e.g., the top 5 tokens) may be visualized/highlighted using color(s) different from that for the other tokens or marking with an asterisk on the heatmap (e.g., HMP4a), as those indicated by the dashed boxes in the heatmap HMP4a.

The last or later multi-head attention layer(s) of the classification model 80 may have more semantic meaning/significance, because each token accumulates additional contextual relationships each time self-attention is applied. For example, the classification model 80 may aggregate attention weights (e.g., $\alpha_{ij}^{(y)}$) of later multi-head attention layers (e.g., the p-th multi-head attention layer 8MHAp to the q-th multi-head attention layer 8MHAq) for each token (e.g., the i-th token) to generate a heatmap (e.g., MfP4a), such that the color intensity of the i-th token of the heatmap may be proportional to $\Pi_{y=p}^{q} \Sigma_{j=1}^{x} \alpha_{ij}^{(y)}$ a to visualize the multi-head attention mechanism of the classification model 80 in Step S510. The number (e.g., 2 layers) of the multi-head attention layers being aggregated (e.g., 8MHA7-8MHA8) may be, for example, less than or equal to 5/12 or 1/6 of the total number (e.g., 12 layers) of all the multi-head attention layers (e.g., 8MHA1-8MHAz). The layer number (e.g., 7 or 8) (e.g., the layer number of the later multi-head attention layer) of the multi-head attention layers being aggregated (e.g., 8MHA7 or 8MHA8) may be, for example, greater than ½ of the total number (e.g., 12 layers) of all the multi-head attention layers (e.g., 8MHA1-8MHAz), or less than or equal to ⅔ of the total number (e.g., 12 layers) of all the multi-head attention layers (e.g., 8MHA1-8MHAz).

In another embodiment, the multi-head attention mechanism of the classification model (e.g., 60, 11Cla, or 11CLb) may be visualized in Step S510 according to gradient-based sensitivity analysis.

In another embodiment, the multi-head attention mechanism of the classification model (e.g., 60, 11Cla, or 11CLb) may be visualized in Step S510 according to attribution propagation based on deep Taylor decomposition (DTD).

Figure 9:
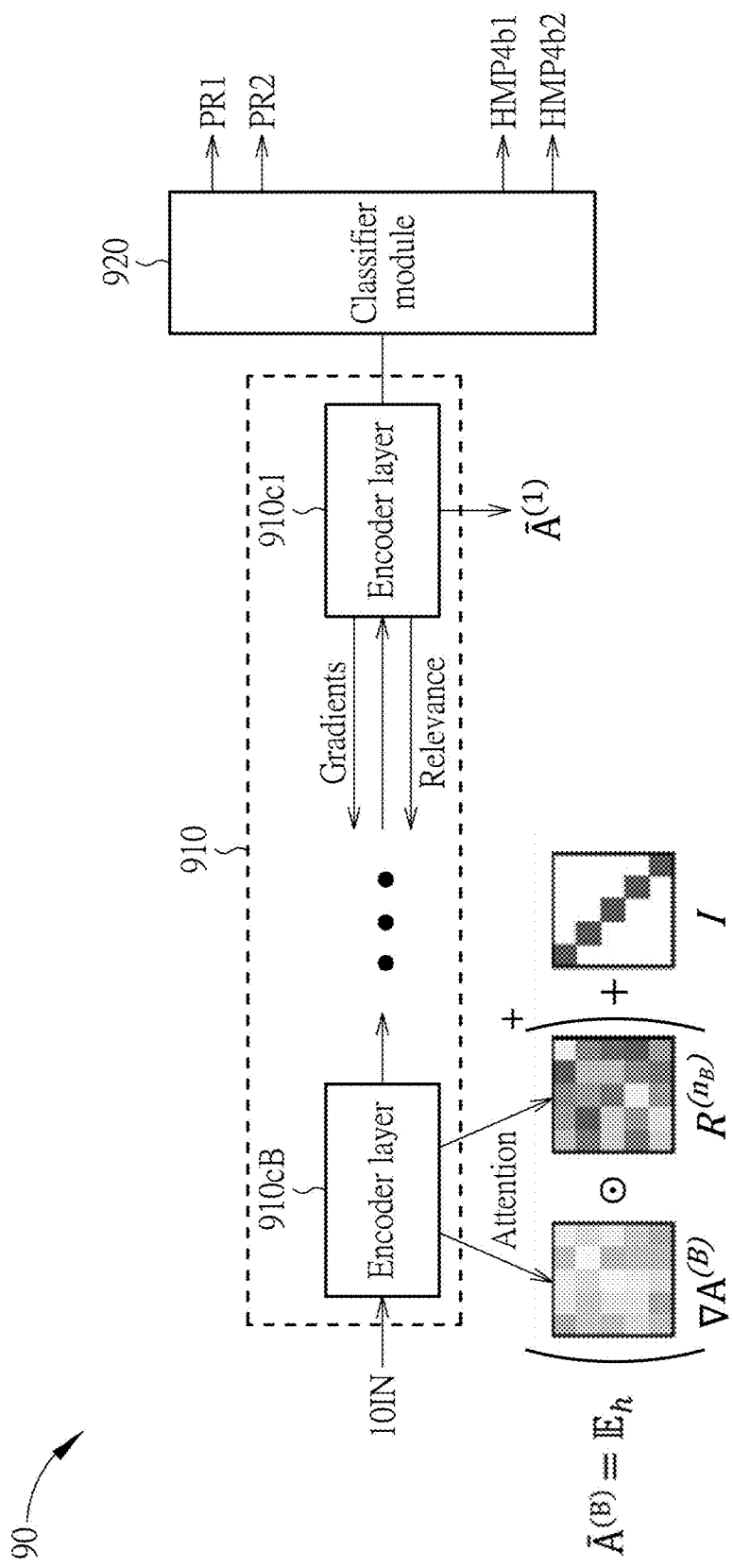

In another embodiment, the multi-head attention mechanism of the classification model (e.g., 60, 90, 11Cla, or 11CLb) may be visualized in Step S510 for different toxicant classes (e.g., TX1-TXt). The classification device 10 may calculate local relevance, so that the classification model may visualize the classification task of natural language processing. For example, FIG. 9 is a schematic diagram of a classification model 90 according to an embodiment of the present invention. The classification model 90 may include a language model module 910 and a classifier module 920. The language model module 910 may include encoder layers 910c1 to 910cB, and each encoder layer (e.g., 910cB) may include a multi-head attention layer including a plurality of attention heads. The encoder layers 910c1-910cB and the classifier module 920 may be implemented using the encoder layer 710 and the classifier module 620 respectively. The classification model 90 may introduce a classification relevance propagation mechanism, which is applicable to both positive and negative attributions to enable propagate between the encoder layer (e.g., 910c1) and the encoder layer (e.g., 910c2). Besides, normalization for non-parametric layers is adopted to ensure that the relevance during matrix addition (e.g., skip-connection) and matrix multiplication remains within a specific range, to address numerical instability in the process of numerical propagation. Moreover, the classification model 90 may integrate gradient diffusion and relevance, and combine multi-head attention layers of encoder layers to obtain the final/integrated result. For example, layer-wise relevance propagation may be used to calculate relevance for each multi-head attention layer, and then backpropagation of gradients for each multi-head attention layer is performed with respect to toxicant class for visualization, followed by layer aggregation with rollout. A gradient is used to average attention head(s). Relevance is used to assess the relative importance of input feature(s) to the classification model 90. Gradient diffusion is used to explain the attention mechanism of the classification model 90, clarifying how the classification model 90 focuses on key tokens at different positions in the input sequence.

In other words, the classification model 90 may generate a matrix C satisfying $C = \overline{A}^{(1)} \cdot \overline{A}^{(2)} \cdot \ldots \cdot \overline{A}^{(B)}$ for one specific toxicant class (e.g., TX1, ..., or TXt), where $\overline{A}^{(1)}$-$\overline{A}^{(B)}$ represent weighted attention relevance of the encoder layers 910c1-910cB respectively. Any weighted attention relevance $\overline{A}^{(b)}$ of the weighted attention relevance $\overline{A}^{(1)}$-$\overline{A}^{(B)}$ satisfies $\overline{A}^{(b)} = I + \mathbb{E}_h (\nabla A^{(b)} \odot R^{(n_b)})^+$, where $A^{(1)}$ to $A^{(B)}$ represent attention maps of the encoder layers 910c1-910cB, each attention map $A^{(b)}$ of the attention maps $A^{(1)}$ to $A^{(B)}$ for one specific toxicant class (e.g., TX1, ..., or TXt) has its gradient $\nabla A^{(b)}$ and relevance $R^{(n_b)}$ (i.e., $\nabla A^{(B)}$ represents the gradient of a multi-head attention layer of the encoder layer 910cB in the classification model 90, and $R^{(n_B)}$ represents the relevance of the multi-head attention layer of the encoder layer 910cB in the classification model 90), I represents the identity matrix, and $\mathbb{E}_h$ represents the mean/average of output results of attention heads. Here, $0 \leq \Sigma_j \overline{R}_j^{u(n_b)}$ and $\Sigma_k \overline{R}_k^{v(n_b)} \leq \Sigma_i R_i^{(n_b-1)}$, ensuring that the cross-layer relevance for each toxicant class (e.g., TX1, ..., or TXt) is kept within a specific range. Furthermore, the maximum length of the matrix C being output is 512 tokens in the field of natural language processing. If the number of toxicant class/classes (e.g., TX1-TXt) is t, the class number of the classification head(s) would be t, where the toxicant classes TX1-TXt represent those to be visualized. The relevance and the gradient(s) about certain toxicant class (e.g., TX1, ... or TXt) are propagated; that is, the matrix C final returned represents the relevance output between each token in each row and other tokens for a certain toxicant class (e.g., TX1, ... or TXt). For example, each grayscale block in FIG. 9 corresponds to a token. For the linguistic classification task, the classification model 90 may use a BERT-based model as a classifier, assuming a maximum of 512 tokens, and a classification token [CLS] that is used as an input to the classification head(s).

For ease of explanation, in FIG. 9, the classification model 90 may, corresponding to the toxicant classes TX1 and TX2, output the probabilities PR1 and PR2 and the heatmaps HMP4b1 and HMP4b2. However, the present invention is not limited thereto. The classification model 90 may, corresponding to the toxicant classes TX1 to TXt, output the probabilities PR1-PRt and the heatmaps HMP1-HMPm. A heatmap (e.g., HMP1, ..., or HMPm) may be related or proportional to the matrix C to visualize the multi-head attention mechanism of the classification model 90 in Step S510.

If it is determined in Step S512 that the training phase is not successfully completed (e.g., the model accuracy is not high enough), it may return to one of Steps S502-S508 to train the classification model (e.g., 60, 80, 90, 11Cla, or 11CLb). For example, in one embodiment, it may go back to Step S504 to input more data into the classification model (60, 80, 90, 11Cla, or 11CLb). In yet another embodiment, it may go back to Step S506 to change method(s) for the data pre-processing to convert data (e.g., 10IN or 20IN) into conversion data of another form, for example, changing the method of converting a numerical field (data/subdata) into categorical type (data/subdata). In yet another embodiment, it may go back to Step S502 to make the language model module (e.g., 610, 810, 910, or 1110) adopt a different pre-trained language model, for example, replacing BioClinicalBERT with BERT. In yet another embodiment, it may go back to Step S508 to use another/different neural network in the classifier module (e.g., 620, 820, 920, or 1120).

If it is determined in Step S512 that the training phase is completed, it may enter the prediction phase to infer/predict using the classification model (60, 80, 90, 11Cla, or 11CLb). After unlabeled data is input to the classification model having been trained in Step S514, the prediction phase begins.

Steps S514 and S516 may be corresponding/similar to or the same as Steps S504 and S506 respectively. In Steps S514 and S516, conversion data or data (e.g., 10IN or 20IN) input to the classification device 10 is unlabeled data; on the other hand, in Steps S504 and S506, conversion data or data (e.g., 10IN or 20IN) input to the classification device 10 is labeled data. Steps S518 and S520 may be performed similarly to Steps S508 and S510 respectively. In Step S518, parameters of the classification model (60, 80, 90, 11CIa, or 11CLb) may not change because of the data (e.g., 10IN or 20IN) input; on the other hand, in Step S508, parameters of the classification model (60, 80, 90, 11CIa, or 11CLb) may change because of the data (e.g., 10IN or 20IN) input so as to train the classification model in Step S508.

In one embodiment, at least part of a classification method, which may reflect the usage scenario of a poisoning/toxic diagnosis artificial intelligence-assisted (AI-assisted) consultation system, may be compiled into a program code (e.g., 114) and may be adopted by the classification device 10. The classification method may include the following steps:

Step S1000: Start.

Step S1002: The classification device 10 may receive data (e.g., 10IN or 20IN). Next, proceed to Step S1004.

Step S1004: The classification device 10 may determine whether the toxicant class of the data (e.g., 10IN or 20IN) is known. If the toxicant class is known, proceed to Step S1008; if the toxicant class is unknown, proceed to Step S1006.

Step S1006: The classification device 10 may make inference(s)/prediction(s) based on the data (e.g., 10IN or 20IN). Then, proceed to Step S1008.

Step S1008: The classification device 10 may provide toxicological data corresponding to the toxicant class (e.g., TX1) to offer relevant information about the toxicant class (e.g., TX1). Next, Step S1012 is executed.

Step S1012: End.

The classification method is further detailed below. Here, one or more of Steps S1002 to S1008 may be omitted/deleted according to different requirements.

If the classification device 10 determines in Step S1004 that the toxicant class of the data (e.g., 10IN or 20IN) is unknown, Steps S1002 and S1006 may be corresponding/similar to or the same as the prediction phase of the classification method 50M. Specifically, Step S1002 may be corresponding/similar to or the same as Step S514, and the data (e.g., 10IN or 20IN) input to the classification device 10 is unlabeled data. Step S1006 may include or correspond to Steps S516-S520. The classification model having been trained (e.g., 60, 80, 90, 11CIa, or 11CLb) may infer/predict the heatmap(s) (e.g., HMP1-HMPm or HMP4$a$-HMP4$b$2) and the probabilities (e.g., PR1-PRt) of the toxicant classes (e.g., TX1-TXt) in Step S1006. In one embodiment, the classification device 10 may execute a classification model (e.g., the classification model 60, 80, 90, 11CIa, 11CLb, other AI-assisted diagnosis module, or an intelligent recommendation service application programming interface (API)) in Step S1006.

In one embodiment, examiner(s) (or personnel of the poison control center) may check/review data (e.g., 10IN or 20IN) input to the classification device 10, the heatmap(s) (e.g., HMP1-HMPm or HMP4$a$-HMP4$b$2), and the probabilities (e.g., PR1-PRt) of the toxicant classes (e.g., TX1-TXt) output from the classification device 10 in Step S1006. The examiner(s) may determine/assess whether the output of the classification device 10 is appropriate. If the output of the classification device 10 is deemed inappropriate, the examiner(s) may input new data corresponding to the data previously input (e.g., 10IN or 20IN) to the classification device 10 or may provide feedback to the classification device 10.

In one embodiment, toxicant class/classes is/are not limited to the toxicant classes presented in the window 30, and the number of toxicant class/classes may increase/decrease if necessary. For example, a window (e.g., 30) may show an option of "other", indicating that the cause of poisoning of a patient may be a toxicant class other than the specified ones, such as organophosphates (OPs), pyrethroids (PYRs), glyphosate-isopropylammonium (Glyph osate IPA), glufosinate, emamectin benzoate. Alternatively, toxicant classes may include household chemicals (e.g., disinfectants, detergents, cleaning agents, etc.), environmental pesticides, rodenticides, industrial chemicals, specific chemical substances, or venomous animals (e.g., venomous snakes, venomous fishes, bees, hornets, or other poisonous insects), but are not limited thereto.

In other words, the classification device 10 may categorize all patients' data collected by the poison control center over the years according to toxicant classes, then build a poisoning database based on primary clinical symptoms of the patients (e.g., whether pupils are dilated or constricted, whether a patient is unconscious/comatose, sweating, or metabolic acidosis), and utilize AI technology of the classification model to assist examiner(s) in diagnosing the cause of poisoning based on poisoning symptoms. When an examiner finds a poisoning case of an unknown toxicant class, the examiner may enter/input clinical symptoms, test values, or basic information about the patient into a window (e.g., 20) in Step S1002. After identification and analysis by AI technology in Step S1006, the classification device 10 may provide/show a list of toxicant class/classes for possible causes of poisoning, and provide/show in Step S1008 relevant toxicological data (e.g., toxic substance) and diagnosis/treatment recommendations for the examiner's reference. Since early diagnosis and correct emergency treatment after poisoning affect the prognosis of a patient, the present invention may use informatization and intelligent information technology to simplify cumbersome procedures of handling poisoning incidents, reduce delays in acute poisoning treatment due to avoidable factors affecting patient prognosis (e.g., busy phone lines or communication gaps), and provide reference criteria/materials for examiners. In this way, the diagnosis time may be shortened, and the accuracy of the examiner's diagnosis may be improved.

Figure 10:
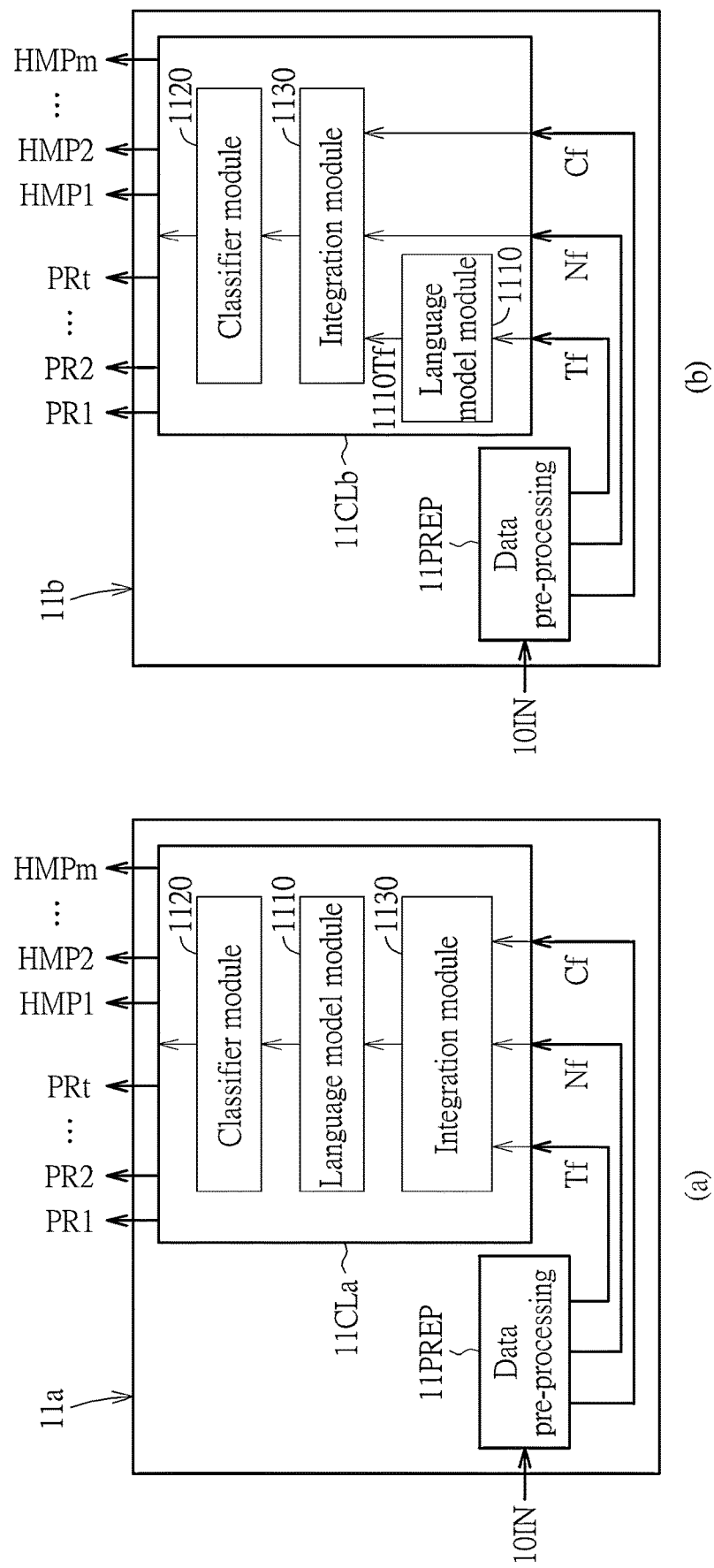

FIG. 10 is a schematic diagram of classification devices 11$a$ and l1$b$ according to an embodiment of the present invention. The classification device 10 may be implemented using the classification device 11$a$ or l1$b$. The classification device 11$a$ shown in FIG. 10 ($a$) may include data pre-processing 11PREP (or its corresponding data pre-processing circuit) and a classification model 11CLa (or its corresponding classification model circuit). The classification device 11$b$ shown in FIG. 10 ($b$) may include data pre-processing 11PREP (or its corresponding data pre-processing circuit) and a classification model 11CLb (or its corresponding classification model circuit). The classification model 11CLa (or 11CLb) may be, for example, Transformer with Tabular, and may include a language model module 1110, a classifier module 1120, and an integration module 1130. In one embodiment, the data pre-processing 11PREP may be configured to perform Step S506 or S516 (e.g., tokenization or categorical (type) encoding). In one embodiment, the language model module 1110 may be implemented using the language model module 610, 810, or 910, and, for example, adopt Transformer. In one embodiment, the classifier module 1120 may be implemented using the classifier module 620, 820, or 920, and, for example, include fully connected layer(s).

In FIG. 10 ($a$), the data pre-processing 11PREP may output text feature(s) Tf, categorical feature(s) Cf, and numerical feature(s) Nf to the language model module 1110.

In FIG. 10 (b), the data pre-processing 11PREP may output the text feature(s) Tf to the language model module 1110. The integration module 1130 may receive the categorical feature(s) Cf and the numerical feature(s) Nf output from the data pre-processing 11PREP and output 1110Tf output from the language model module 1110. The categorical feature(s) Cf, which may be categorical type data/subdata and may be divided into groups, may be, for example, gender or data (e.g., body temperature) converted from numerical type into categorical type in Step S506. The numerical feature(s) Nf, which may be numerical type data/subdata or numerical field(s) data/subdata, may be, for example, respiratory rate.

thereto. In one embodiment, sparse data (e.g., 20N) may be inserted/fitted, allowing missing values to be placed/inserted/keyed into Tabular for input. In one embodiment, although data (e.g., 20CN) having been collected for a patient may lack certain item(s) of vital signs (resulting in missing values), a multimodal-Toolkit may be used to ensure that the performance and reasoning of the classification device 11a or 11b. In other words, the text feature(s) Tf, the categorical feature(s) Cf, or the numerical feature(s) Nf may undergo different processing before being concatenated.

TABLE 2

| Combine Feat Method | Description |
| --- | --- |
| Concat | Concatenate the output 1110Tf (or the text feature Tf), the categorical feature(s) Cf and the numerical feature(s) Nf (all at once before final classifier layer(s)). |
| mlp_on_categorical_then_concat | Perform multilayer perceptron on the categorical feature(s) Cf, then concatenate the output 1110Tf (or the text feature Tf), the numerical feature(s) Nf, and the categorical feature(s) Cf having been processed (before final classifier layer(s)). |
| individual_mlps_on_cat_and_numerical_feats_then_concat | Perform separate multilayer perceptron on the categorical feature(s) Cf and the numerical feature(s) Nf, then concatenate the output 1110Tf (or the text feature Tf), with the numerical feature(s) Nf having been processed, and the categorical feature(s) Cf having been processed (before classifier layer(s)). |
| mlp_on_concatenated_cat_and_numerical_feats_then_concat | Concatenate the categorical feature(s) Cf and the numerical feature(s) Nf, then perform multilayer perceptron on the categorical feature(s) Cf and the numerical feature(s) Nf having been concatenated, and then concatenate the processed result of the categorical feature(s) Cf and the numerical feature(s) Nf with the output 1110Tf (or the text feature Tf) (before final classifier layer(s)). |
| attention_on_cat_and_numerical_feats | Perform attention based summation of the output 1110Tf (or the text feature Tf), the categorical feature(s) Cf, and the numerical feature(s) Nf (before final classifier layer(s)). |

The text feature(s) Tf may be pure textual data, such as incident details or preliminary treatment.

For the multimodal data structure of data (e.g., 10IN or 20IN), in one embodiment, laboratory data and vital signs of a patient (e.g., the categorical feature(s) Cf or the numerical feature(s) Nf) may be pre-processed during data pre-processing, and integrated/combined into pure text field (e.g., the text feature(s) T for (poisoning) incident details) to perform training of text model. In one embodiment, a multimodal-Toolkit, which may merge/incorporate multimodal data (e.g., the categorical feature(s) Cf or the numerical feature(s) Nf to text (e.g., the text feature(s) TI) for classification and regression tasks, may be used. In one embodiment, a basic model of HuggingFace transformer for the text feature(s) Tf may be used. In one embodiment, a combine feat method (e.g., combine feat methods listed in Table 2) may be used, but the invention is not limited In one embodiment, b, B, i, j, k, l, n, N, m, M, p, q, t, u, v, x, y, z, and Z are positive integers greater than or equal to 1, respectively, and m is less than t.

In summary, despite of the diversity of toxicant classes and the various symptoms after poisoning, the present invention can assist examiners to diagnose the toxicant class of a patient based on the vital signs and symptoms of the patient even if the toxicant class is unknown.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A classification method, for a classification device, comprising:
   obtaining, by the classification device, first data of a patient; and
   generating, by a classification model circuit of the classification device, at least one heatmap and at least one probability of at least one toxicant class according to a classification model using the first data,
   wherein each of the at least one toxicant class corresponds to one of the at least one probability, and each of the at least one heatmap for the patient is used to visualize influence of each of a plurality of tokens of the first data on attributing the patient's cause of poisoning to one or more of the at least one toxicant class;
   wherein a darker-colored token in one of the at least one heatmap represents a higher influence on classifying the first data as a toxicant class;
   wherein color intensity of any of the at least one heatmap corresponding to the plurality of tokens or the i-th of the plurality of tokens is related to $\overline{A}^{(1)} \cdot \overline{A}^{(2)} \cdot \ldots \cdot \overline{A}^{(B)}$ or $\Pi_{y=p}^{q} \Sigma_{j=1}^{x} \alpha_{ij}^{(y)}$, where any of $\overline{A}^{(1)}$ to $\overline{A}^{(B)}$ represents a weighted attention relevance of one of a plurality of encoder layers, p represents the p-th multi-head attention layer, q represents the q-th multi-head attention layer, x represents the x-th of the plurality of tokens, and $\alpha_{ij}^{(y)}$ represents an attention weight, wherein a weighted attention relevance $\overline{A}^{(b)}$ of the plurality of weighted attention relevance $\overline{A}^{(1)}$ to $\overline{A}^{(B)}$ satisfies $\overline{A}^{(b)} = I + \mathbb{E}_h (\nabla A^{(b)} \odot R^{(n_b)})^+$ where I represents an identity matrix, $\nabla A^{(b)}$ and $R^{(n_b)}$ represent relevance and a gradient of an attention map of one of the plurality of encoder layers respectively, $\mathbb{E}_h$ represents an average.

2. The classification method of claim 1, further comprising:
   receiving second data; and
   data pre-processing the second data to convert the second data into the first data, wherein numerical field subdata of the second data is converted into categorical type subdata of the first data.

3. The classification method of claim 1, wherein
   the classification model outputs a plurality of heatmaps corresponding to a plurality of toxicant classes respectively, such that at least one of the plurality of heatmaps is different from another of the plurality of heatmaps; or
   the classification model outputs only one heatmap corresponding to all the plurality of toxicant classes.

4. The classification method of claim 1, wherein any of the at least one heatmap is related to a product of a plurality of weighted attention relevance of the plurality of encoder layers of the classification model, and any of the plurality of weighted attention relevance is related to relevance and a gradient of an attention map of one of the plurality of encoder layers.

5. The classification method of claim 1, wherein
   generating the at least one probability and the at least one heatmap according to a classification model being multilingual using the first data being multilingual; or
   generating the at least one probability and the at least one heatmap according to a classification model being monolingual using the first data, which is monolingual and translated from second data being multilingual.

6. The classification method of claim 1, wherein training of a classification model is divided into a pre-training stage and a fine-tuning stage, a language model module of the classification model is pre-trained in the pre-training stage to initialize a plurality of parameters of the classification model, and the plurality of parameters of the classification model are fine-tuned using the first data in the fine-tuning stage occurring after the pre-training stage.

7. The classification method of claim 1, wherein generating the at least one heatmap of the at least one toxicant class based on the first data comprises:
   aggregating at least one of a plurality of multi-head attention layers of the classification device to obtain a plurality of weighted scores of the plurality of tokens of the first data, any of the plurality of weighted scores is related to color intensity of any of the at least one heatmap corresponding to one of the plurality of tokens.

8. The classification method of claim 7, wherein the at least one multi-head attention layer is the last one of the plurality of multi-head attention layers.

9. A classification device, comprising:
   a storage circuit, configured to store an instruction comprising:
     obtaining first data of a patient; and
     generating at least one heatmap and at least one probability of at least one toxicant class according to a classification model using the first data, wherein each of the at least one toxicant class corresponds to one of the at least one probability, and each of the at least one heatmap for the patient is used to visualize influence of each of a plurality of tokens of the first data on attributing the patient's cause of poisoning to one or more of the at least one toxicant class, wherein a darker-colored token in one of the at least one heatmap represents a higher influence on classifying the first data as a toxicant class; and
   a processing circuit, coupled to the storage device, configured to execute the instruction stored in the storage circuit;
   wherein color intensity of any of the at least one heatmap corresponding to the plurality of tokens or the i-th of the plurality of tokens is related to $\overline{A}^{(1)} \cdot \overline{A}^{(2)} \cdot \ldots \cdot \overline{A}^{(B)}$ or $\Pi_{y=p}^{q} \Sigma_{j=1}^{x} \alpha_{ij}^{(y)}$, where any of $\overline{A}^{(1)}$ to $\overline{A}^{(B)}$ represents a weighted attention relevance of one of a plurality of encoder layers, p represents the p-th multi-head attention layer, q represents the q-th multi-head attention layer, x represents the x-th of the plurality of tokens, and $\alpha_{ij}^{(y)}$ represents an attention weight, wherein a weighted attention relevance $\overline{A}^{(b)}$ of the plurality of weighted attention relevance $\overline{A}^{(1)}$ to $\overline{A}^{(B)}$ satisfies $\overline{A}^{(b)} = I + \mathbb{E}_h (\nabla A^{(b)} \odot R^{(n_p)})^+$ where I represents an identity matrix, $\nabla A^{(b)}$ and $R^{(n_b)}$ represent relevance and a gradient of an attention map of one of the plurality of encoder layers respectively, $\mathbb{E}_h$ represents an average.

10. The classification device of claim 9, wherein the instruction further comprises:
    receiving second data; and
    data pre-processing the second data to convert the second data into the first data, wherein numerical field subdata of the second data is converted into categorical type subdata of the first data.

11. The classification device of claim 9, wherein
    the classification model outputs a plurality of heatmaps corresponding to a plurality of toxicant classes respectively, such that at least one of the plurality of heatmaps is different from another of the plurality of heatmaps; or
    the classification model outputs only one heatmap corresponding to all the plurality of toxicant classes.

12. The classification device of claim 9, wherein any of the at least one heatmap is related to a product of a plurality of weighted attention relevance of the plurality of encoder layers of the classification model, and any of the plurality of weighted attention relevance is related to relevance and a gradient of an attention map of one of the plurality of encoder layers.

13. The classification device of claim 9, wherein
generating the at least one probability and the at least one heatmap according to a classification model being multilingual using the first data being multilingual; or
generating the at least one probability and the at least one heatmap according to a classification model being monolingual using the first data, which is monolingual and translated from second data being multilingual.

14. The classification device of claim 9, wherein training of a classification model is divided into a pre-training stage and a fine-tuning stage, a language model module of the classification model is pre-trained in the pre-training stage to initialize a plurality of parameters of the classification model, and the plurality of parameters of the classification model are fine-tuned using the first data in the fine-tuning stage occurring after the pre-training stage.

15. The classification device of claim 9, wherein generating the at least one heatmap of the at least one toxicant class based on the first data comprises:
aggregating at least one of a plurality of multi-head attention layers of the classification device to obtain a plurality of weighted scores of the plurality of tokens of the first data, any of the plurality of weighted scores is related to color intensity of any of the at least one heatmap corresponding to one of the plurality of tokens.

16. The classification device of claim 15, wherein the at least one multi-head attention layer is the last one of the plurality of multi-head attention layers.

* * * * *